United States Patent
Humfeld et al.

(10) Patent No.: US 10,228,237 B2
(45) Date of Patent: Mar. 12, 2019

(54) NON-DESTRUCTIVE OPTICAL METHOD FOR DETERMINING MINIMUM BOND STRENGTH AND PROVING BOND EFFICACY

(71) Applicant: The Boeing Company, Chicago, IL (US)

(72) Inventors: Keith D. Humfeld, Tukwila, WA (US); Eileen Kutscha, Tukwila, WA (US)

(73) Assignee: THE BOEING COMPANY, Chicago, IL (US)

( * ) Notice: Subject to any disclaimer, the term of this patent is extended or adjusted under 35 U.S.C. 154(b) by 32 days.

(21) Appl. No.: 15/647,324

(22) Filed: Jul. 12, 2017

(65) Prior Publication Data

US 2019/0017810 A1 Jan. 17, 2019

(51) Int. Cl.
*B64F 5/60* (2017.01)
*G01B 11/16* (2006.01)

(52) U.S. Cl.
CPC .............. *G01B 11/16* (2013.01); *B64F 5/60* (2017.01)

(58) Field of Classification Search
CPC ..................... G01B 11/16; B64F 5/60
See application file for complete search history.

(56) References Cited

U.S. PATENT DOCUMENTS

| | | | | |
|---|---|---|---|---|
| 4,288,852 A * | 9/1981 | Holland | ............... | G01B 11/024 382/152 |
| 4,360,885 A * | 11/1982 | Edgar | ............... | G02B 21/0004 359/376 |
| 4,591,996 A * | 5/1986 | Vachon | ............... | G01L 1/24 356/35.5 |
| 4,598,420 A * | 7/1986 | Harvey | ............... | G01B 11/165 348/88 |
| 6,327,030 B1 * | 12/2001 | Ifju | ............... | G01B 11/20 356/32 |
| 6,539,314 B1 * | 3/2003 | Ondrus | ............... | G06F 17/5018 280/288 |
| 6,874,370 B1 * | 4/2005 | Vachon | ............... | G01N 3/32 73/808 |
| 7,533,818 B2 * | 5/2009 | Hovis | ............... | G01B 11/165 235/462.09 |
| 8,511,155 B2 * | 8/2013 | Patient | ............... | G01L 7/086 73/146 |
| 8,720,278 B1 * | 5/2014 | Toivola | ............... | G01B 11/16 73/762 |
| 9,085,052 B1 * | 7/2015 | Georgeson | ............... | G01K 13/00 |
| 2006/0286407 A1 * | 12/2006 | Amano | ............... | B32B 27/08 428/690 |
| 2007/0277619 A1 * | 12/2007 | Grishaber | ............... | G01B 11/165 73/762 |

(Continued)

FOREIGN PATENT DOCUMENTS

WO  WO 2017034773 A1 *  3/2017  .............. G01M 5/00

*Primary Examiner* — David J Bolduc
(74) *Attorney, Agent, or Firm* — MH2 Technology Law Group, LLP

(57) ABSTRACT

A method for determining a strain includes bonding first and second components together, at an elevated temperature, using a bonding agent. A strain is then measured in the first component using a strain measurement tool as the first component cools from the elevated temperature. The strain measurement tool is configured to detect movement the first component as the first component cools.

20 Claims, 8 Drawing Sheets

(56) References Cited

U.S. PATENT DOCUMENTS

| | | | |
|---|---|---|---|
| 2008/0223152 A1* | 9/2008 | Georgeson | G01B 7/20 73/862.041 |
| 2010/0227105 A1* | 9/2010 | Dan-Jumbo | B29C 73/10 428/63 |
| 2010/0276064 A1* | 11/2010 | Blanchard | B29C 65/7826 156/94 |
| 2010/0310128 A1* | 12/2010 | Iliopoulos | G01B 11/165 382/103 |
| 2011/0316712 A1* | 12/2011 | McIver | G01M 5/0033 340/665 |
| 2012/0070668 A1* | 3/2012 | Georgeson | B29C 65/4855 428/411.1 |
| 2012/0305167 A1* | 12/2012 | Rawlings | B29C 65/8284 156/64 |
| 2013/0063570 A1* | 3/2013 | Michopoulos | G01B 11/165 348/47 |
| 2013/0107004 A1* | 5/2013 | Maeda | G01B 11/16 348/46 |
| 2014/0037217 A1* | 2/2014 | Iliopoulos | G06K 9/6232 382/201 |
| 2014/0160279 A1* | 6/2014 | Grossnickle | G01N 3/068 348/137 |
| 2014/0211195 A1* | 7/2014 | Barcelo | G01B 11/16 356/33 |
| 2015/0308907 A1* | 10/2015 | Georgeson | G01L 1/24 116/201 |
| 2016/0069757 A1* | 3/2016 | Ghatak | G01B 11/165 73/800 |
| 2016/0169664 A1* | 6/2016 | Hayashi | G01B 11/16 356/34 |
| 2018/0038792 A1* | 2/2018 | Toivola | B64F 5/60 |
| 2018/0066937 A1* | 3/2018 | Ikeda | G01B 11/16 |
| 2018/0113036 A1* | 4/2018 | Uemura | G01B 11/18 |

* cited by examiner

NON-DESTRUCTIVE OPTICAL METHOD FOR DETERMINING MINIMUM BOND STRENGTH AND PROVING BOND EFFICACY

TECHNICAL FIELD

The present teachings relate to the field of bonding two surfaces together and, more particularly, to measuring a strain between two bonded surfaces that have different coefficients of thermal expansion (CTE).

BACKGROUND

Oftentimes, two components on an aircraft are mechanically coupled together using fasteners (e.g., bolts). Load limit testing is not required for components that are mechanically coupled together. However, as will be appreciated, it can be desirable to minimize the weight of the aircraft, and mechanical fasteners are heavier than bonding agents (e.g., adhesive) that can be used to couple (i.e., bond) the components together.

The Federal Aviation Administration (FAA) requires components that are coupled together with a bonding agent to be tested to the design limit to ensure that the bond is strong enough support its design load. This testing to the design limit is time-consuming, expensive, and can require special loading fixtures. Thus, it would be desirable to be able to test the strength of the bond without having to test to the design limit.

SUMMARY

The following presents a simplified summary in order to provide a basic understanding of some aspects of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for determining a strain is disclosed. The method includes bonding first and second components together, at an elevated temperature, using a bonding agent. A strain is then measured in the first component using a strain measurement tool as the first component cools from the elevated temperature. The strain measurement tool is configured to detect movement the first component as the first component cools.

In another implementation, the method may include applying a visual indicator material to a first component. A bonding agent may also be applied to the first component. The first and second components may be pressed together with the bonding agent positioned at least partially therebetween. The first component and the bonding agent may be heated and subsequently cooled. A strain may then be measured in the first component using a strain measurement tool. The strain measurement tool is configured to detect movement of the visual indicator material on the first component as the first component cools.

In yet another implementation, the method may include applying a visual indicator material to a first component and a second component. The first and second components have different coefficients of thermal expansion. A bonding agent is also applied to the first component, the second component, or both. The first component and the second component are pressed together with the bonding agent positioned at least partially therebetween. The first component, the second component, and the bonding agent are heated and subsequently cooled. A strain is measured in the first component, the second component, or both using a strain measurement tool without applying external forces to the first component and the second component. The strain measurement tool detects movement of the particles in the visual indicator material as the first component, the second component, or both deform in response to the cooling.

The features, functions, and advantages that have been discussed can be achieved independently in various implementations or can be combined in yet other implementations further details of which can be seen with reference to the following description and drawings.

BRIEF DESCRIPTION OF THE DRAWINGS

The accompanying drawings, which are incorporated in and constitute a part of this specification, illustrate the present teachings and together with the description, serve to explain the principles of the disclosure. In the figures.

It should be noted that some details of the Figures have been simplified and are drawn to facilitate understanding of the present teachings rather than to maintain strict structural accuracy, detail, and scale.

DETAILED DESCRIPTION

Reference will now be made in detail to examples of the present teachings, which are illustrated in the accompanying drawings. Wherever possible, the same reference numbers will be used throughout the drawings to refer to the same or like parts.

Figure 1A:
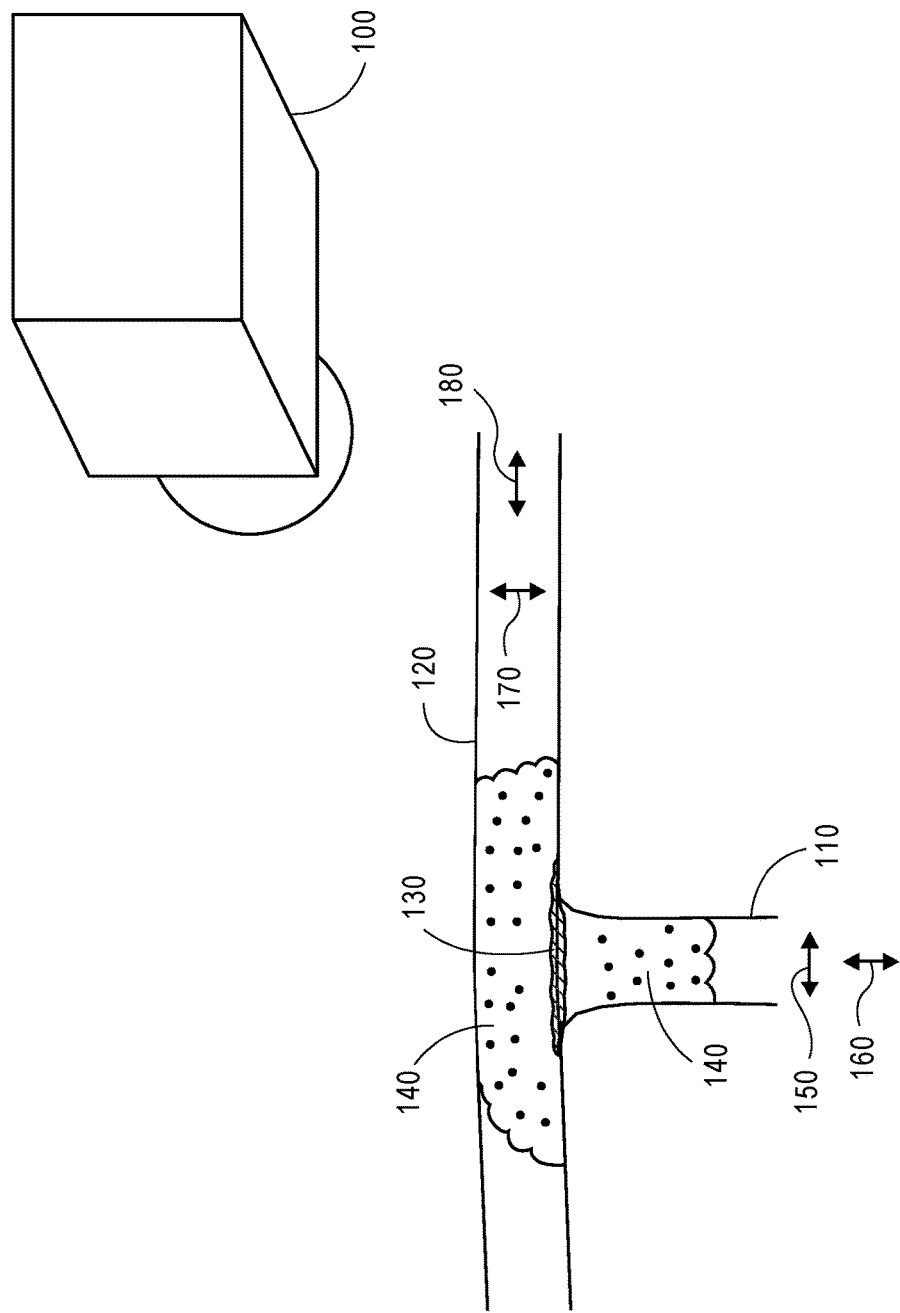
FIG. 1A depicts perspective view of a strain measurement tool measuring strain in two components that are bonded together (e.g., in a T-shape).
Figure 1B:
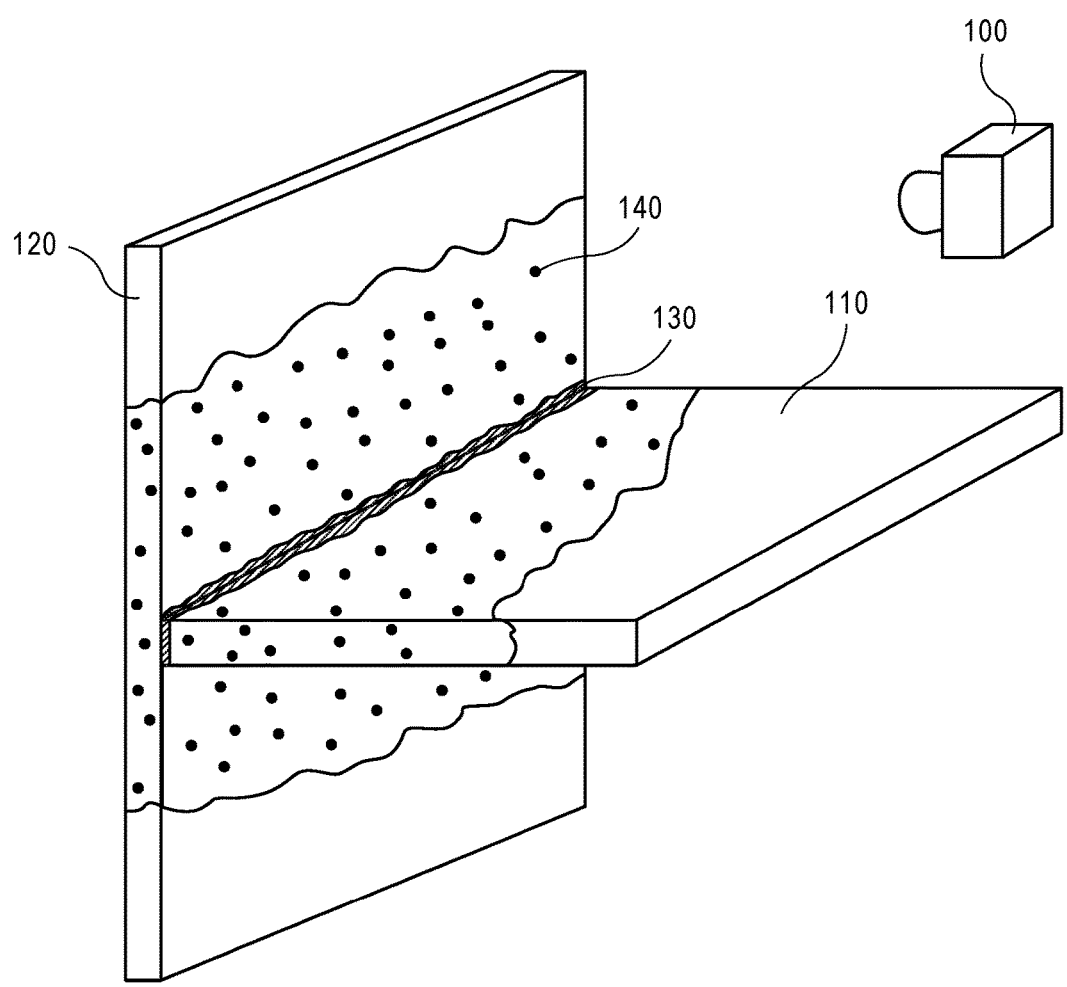
FIG. 1B depicts a different perspective view of the strain measurement tool measuring strain in two components that are bonded together.

FIGS. 1A and 1B depict a strain measurement tool 100 that is configured to measure the strain in two components 110, 120 that are bonded together (e.g., in a T-shape). The strain measurement tool 100 can be a non-contact, optical strain measurement tool. More particularly, the strain measurement tool 100 can be or include a three-dimensional (3D) camera that captures 3D coordinates of the components 110, 120 based on triangulation and using stochastic patterns or reference point markers. For example, the strain measurement tool 100 can be the ARAMIS® tool manufactured by GOM GmbH.

In at least one implementation, the components 110, 120 can be part of an aircraft, such as an airplane, a helicopter, an unmanned aerial vehicle, or the like; however, as will be appreciated, the components 110, 120 can also be used in, or part of, other objects. In one example, the components 110, 120 can be part of a wing, a fuselage, landing gear, or interior structure of an aircraft. The components 110, 120 can be made of the same material or different materials. The material(s) can be or include metals, composites, plastics, or a combination thereof. The components 110, 120 can have different strengths and/or coefficients of thermal expansion (CTE). For example, the first component 110 may have CTE through its thickness (e.g., in direction 150), which may differ from the in-plane CTE of the second component 120 (e.g., in direction 180). The directions 150, 180 may be perpendicular to one another.

The components 110, 120 can be bonded together using a bonding agent (e.g., an adhesive) 130. The bonding agent 130 can be or include a structural aerospace class of adhesives or a general non-structural, non-aerospace class of adhesives. Examples of aerospace structural adhesives are thermoset epoxy adhesives. Examples of a general class of non-structural adhesives are acrylate, silicone, or polyurethane adhesives. The bonding process is described below.

Figure 2:
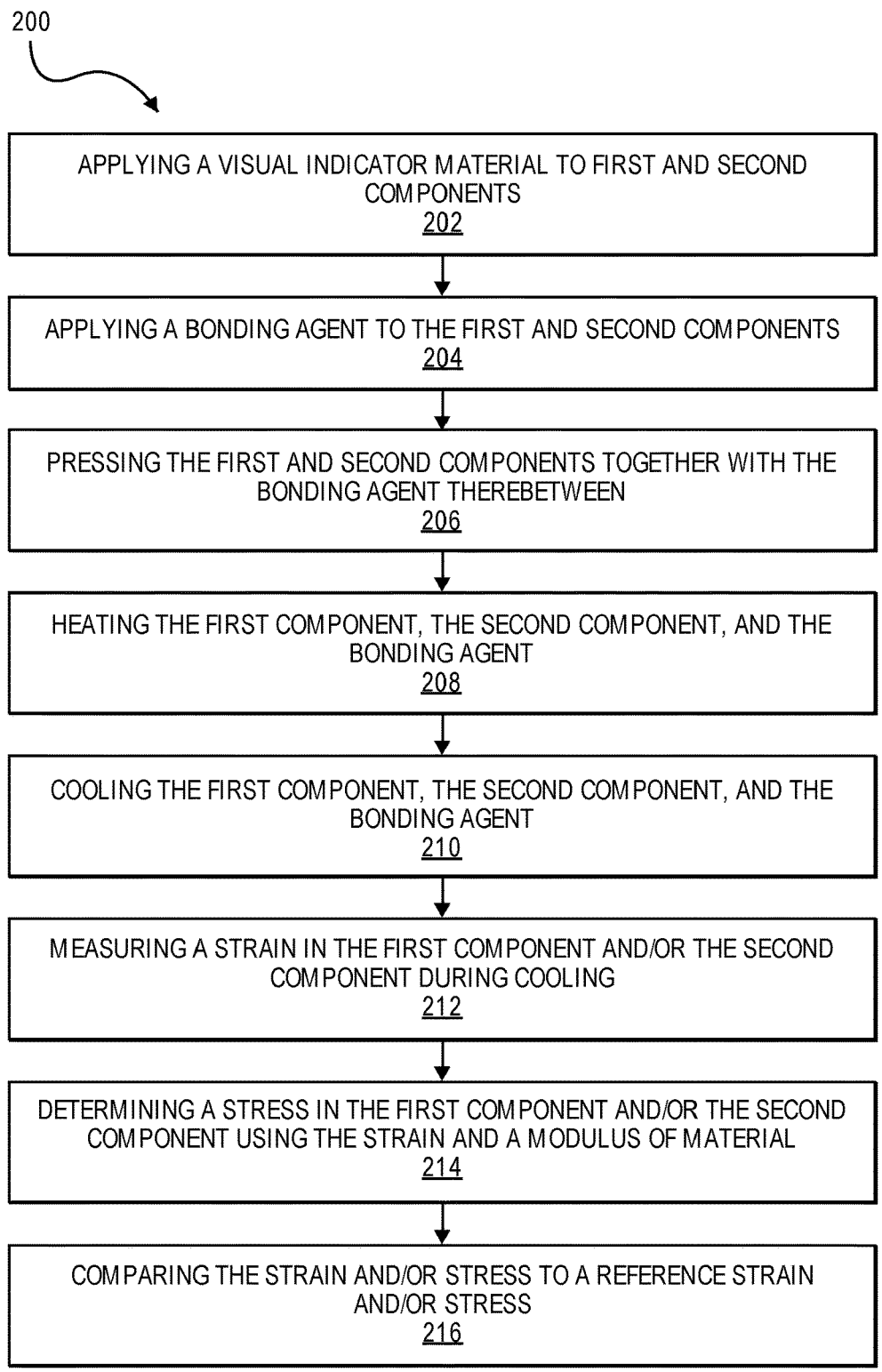
FIG. 2 depicts a flowchart of a method for determining stress and/or strain in two components that are bonded together.

FIG. 2 depicts a flowchart of a method 200 for determining stress and/or strain in two components 110, 120 that are bonded together. The method 200 can include applying a visual indicator material to at least a portion of the first component 110 and/or at least a portion of the second component 120, as at 202. The visual indicator material is shown by reference number 140 in FIGS. 1A and 1B. The visual indicator material 140 may be applied to portions of the first component 110 and/or the second component 120 where the user would like to measure displacement, strain, and/or stress. In one implementation, the visual indicator material 140 may be applied to portions of the first component 110 and/or the second component 120 inside the bond area and/or outside the bond area. As used herein, the term "bond area" refers to the portion of the surface of the first component 110 and/or the second components 120 to which the bonding agent 130 is applied. In one example, the bonding area may be the entire portions of the surfaces of the first and second components 110, 120 that are in contact with one another.

In at least one implementation, the visual indicator material 140 can be or include a liquid (e.g., a high-contrast paint) that is applied/spread on the first and/or second components 110, 120. The visual indicator material 140 can have a plurality of particles dispersed therein (i.e., a speckle pattern). The particles can be a different color than the liquid in which they are dispersed. In one example, the liquid can be a light color (e.g., white), and the particles can be a dark color (e.g., black). In another example, the liquid can be a dark color, and the particles can be a light color.

The method 200 can also include applying the bonding agent (e.g., an adhesive) 130 to the first component 110 and/or the second component 120, as at 204. In at least one implementation, the bonding agent 130 can at least partially overlap at least a portion of the visual indicator material 140. In another implementation, the visual indicator material 140 may at least partially overlap the bonding agent 130. The method 200 can also include pressing/holding the first and second components 110, 120 together with the bonding agent 130 positioned at least partially therebetween, as at 206.

The method 200 can then include heating the first component 110, the second component 120, and/or the bonding agent 130 to a predetermined temperature for a predetermined amount of time while the first and second components 110, 120 are being pressed/held together, as at 208. The predetermined temperature for an aerospace class, epoxy thermoset structural film adhesive can be from about 105° C. to about 125° C. The predetermined amount of time can be from about 80 minutes to about 100 minutes. The predetermined temperature for a general class, non-structural silicone adhesive can be from about 30° C. to about 60° C. The predetermined amount of time can be from about 125 minutes to about 150 minutes. The bonding agent 130 can cure while heated.

The method 200 can also include cooling the first component 110, the second component 120, and/or the bonding agent 130 after heating, as at 210. The cooling can include removing the heat source to allow the first component 110, the second component 120, and/or the bonding agent 130 to cool to an ambient temperature. As the first and second components 110, 120 cool, they can deform (e.g., contract), which can cause stresses at the bond line (i.e., the intersection where the first and second components 110, 120 are bonded together). These stresses can cause strains in the first component 110 and/or the second component 120 inside and/or outside the bond area. As described in greater detail below, measuring the strain outside the bond area can reveal a lower limit to the strength of the bond.

The method 200 can also include measuring strain in the first component 110 and/or the second component 120 using the strain measurement tool 100, as at 212. The strain can be measured as the first and second components 110, 120 are being heated and/or cooled. The strain can be measured without applying any external forces to the first and/or second components 110, 120. In other words, the only forces experienced by the first and second components 110, 120 can be the forces associated with the deformation (i.e., expansion and/or contraction) of the first and second components 110, 120 due to the temperature changes. Thus, the strength of the bond is not tested to its design limits, as in conventional testing procedures. In addition, neither the first component 110, the second component 120, nor the bonding agent 130 are broken or otherwise destructed during the measuring step.

When measuring the strain in the first component 110 and/or the second component 120, the strain measurement tool 100 can detect/measure the movement of the particles in the visual indicator material 140 as the particles move due to the deformation of the first and second components 110, 120. More particularly, the strain measurement tool 100 can track the changes in the intensity of the pixels as the particles enter and leave the field of view of each pixel. This allows a very sensitive measurement of the deformation of the first and second components 110, 120.

In at least one implementation, measuring the strain can include comparing the displacement near the bond area to the displacement far from the bond area to determine the strain caused by the stress transferred between the first and second components 110, 120 by the cured bonding agent 130. As used herein, "near the bond area" can include from about 0 mm from the edge of the bonding agent 130 to about 2.5 mm from the edge of the bonding agent 130, and "far from the bond area" can include from about 2.5 mm from the edge of the bonding agent 130 to about 12 mm from the edge of the bonding agent 130.

The method 200 can also include determining stress in the first component 110 and/or the second component 120 based at least partially upon the measured strain and a modulus of material of the first and/or the second component 120, as at

214. More particularly, the stress (measured in units of pressure such as psi) can be determined by multiplying the strain (measured in dimensionless units such as in/in) by the modulus of the material in the direction of the strain (measured in units of pressure such as psi). The minimum strength of the bond can be determined by, or associated with, the stress.

The method 200 can also include comparing the determined strain and/or stress to a reference strain and/or stress (e.g., determined by an industry standard) to determine whether the bond is of sufficient strength, as at 216.

Figure 3:
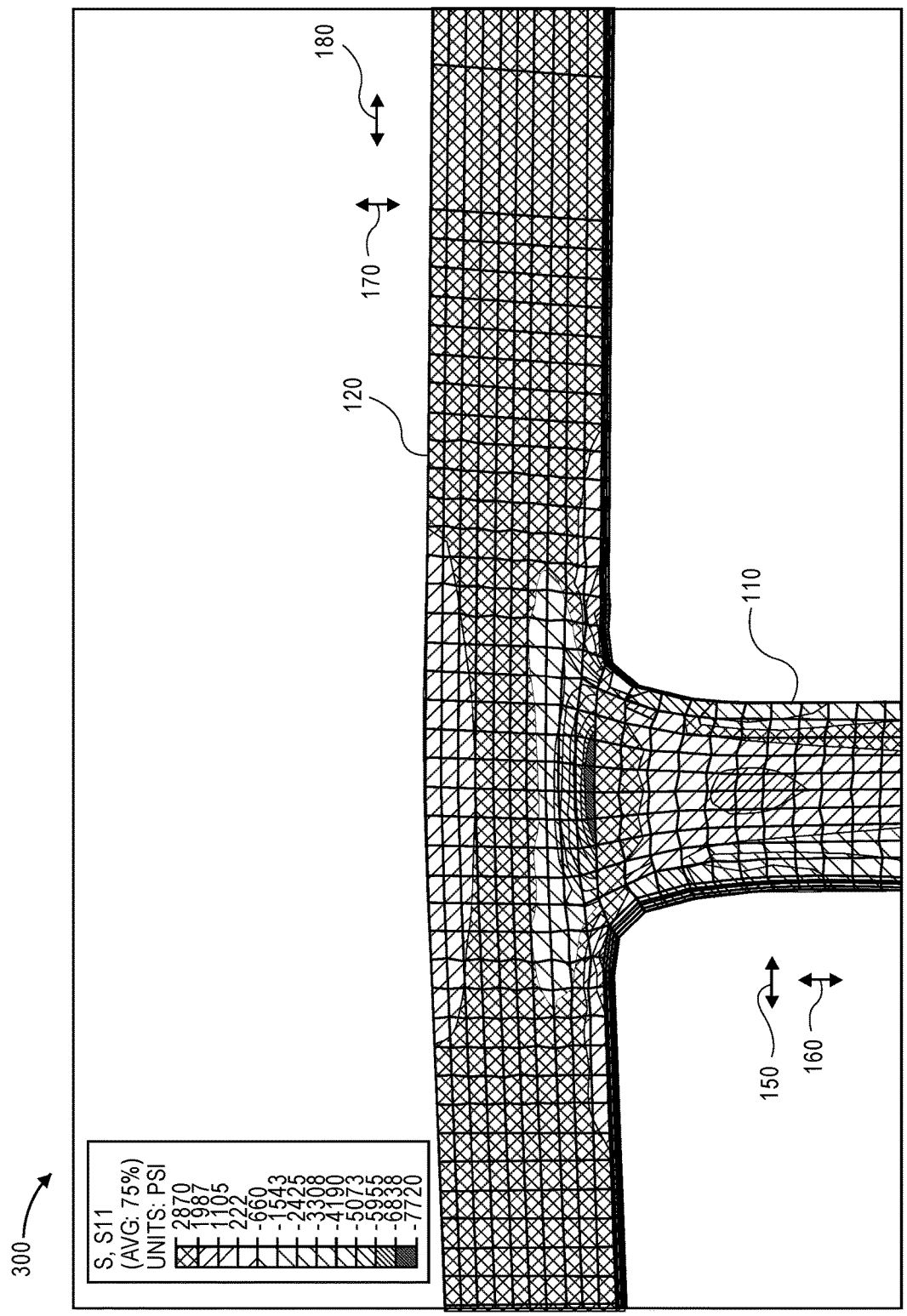
FIG. 3 depicts an image showing stress in the two components (from FIGS. 1A and 1B) that are bonded together in the T-shape.

FIG. 3 depicts an image 300 showing stress in the first and second components 110, 120 that are bonded together in the T-shape. As mentioned above, the first and second components 110, 120 can have different CTEs. The first and second components 110, 120 can also have different strengths and/or hardnesses. As shown, an end of the first component 110 can be bonded to a side/face of the second component 120.

For some illustrative materials (e.g., aerospace composite materials), the through-thickness CTEs 150, 170 are approximately 10× greater than the in-plane CTEs 160, 180 (see FIGS. 1A and 1B). During the heating step, there can be no force transferred by the bonding agent 130 from the first component 110 to the second component 120, so the deformation in the first and second components 110, 120 will be only that caused by the thermal expansion. However, after the bonding agent 130 cures, and when the first and second components 110, 120 cool, the first component 110 can contract more in its through-thickness direction due to CTE 150 than the second component 120 contracts in its in-plane direction due to CTE 180, resulting in compressive forces in the second component 120 within the bond area, and tensile forces in the first component 110 within the bond area.

Figure 4:
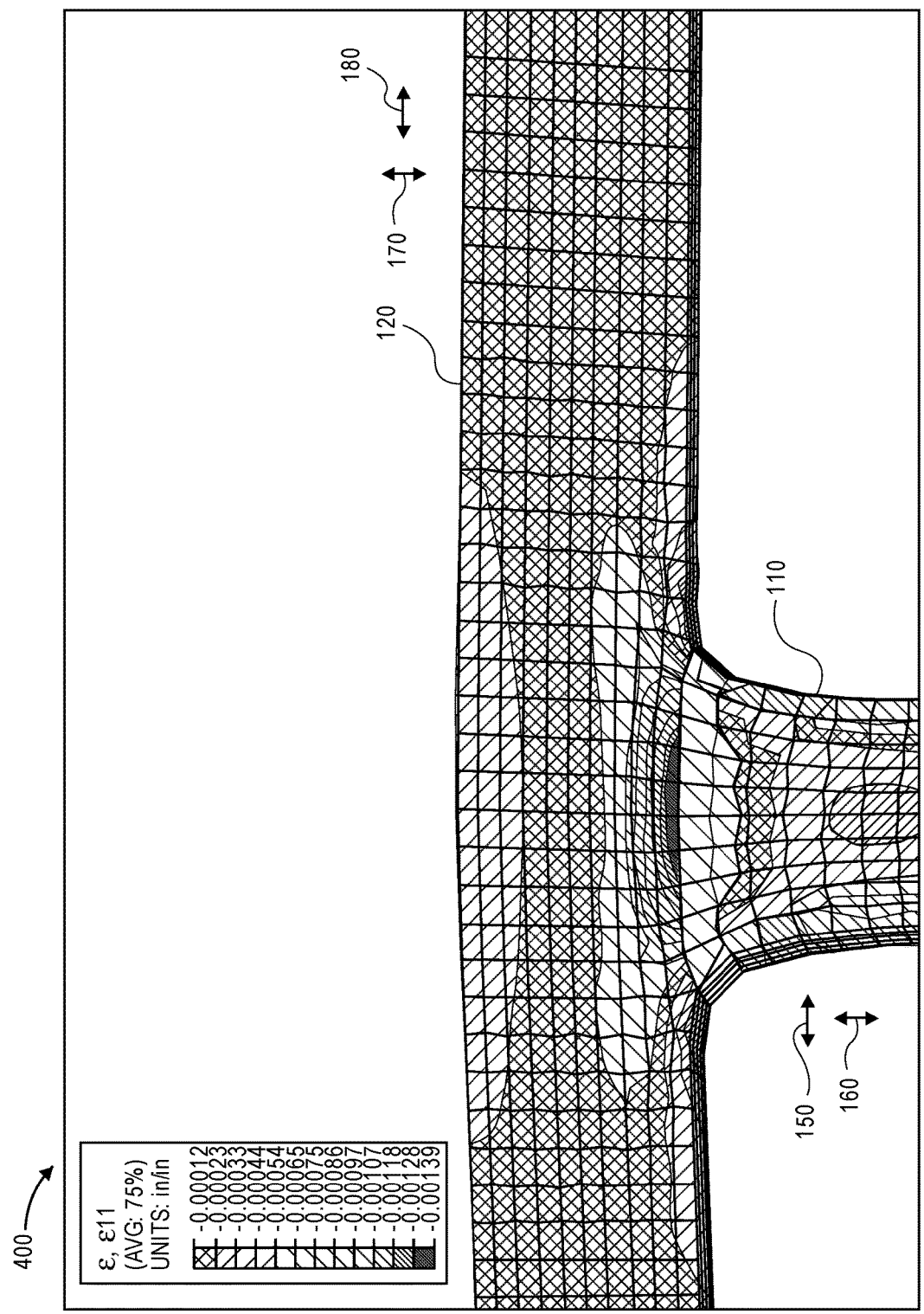
FIG. 4 depicts an image showing strain in the two components (from FIGS. 1A and 1B) that are bonded together in the T-shape.

FIG. 4 depicts an image 400 showing strain in the first and second components 110, 120 that are bonded together in the T-shape. In FIG. 4, the deformation is magnified 75×. The strain inside the bond area of the second component 120 is $-1.2E-4$ in/in. This can be compared to the non-bonded thermal deformation of $-4.6E-4$ in/in for the second component 120 from the cure temperature down to ambient (i.e., room) temperature. The measured strain compared to the thermal-only strain ($-1.2E-4$ in/in is measurable and is considerably lower magnitude than the $-4.6E-4$ in/in) can be multiplied by the known modulus of the material to determine the stress, as shown in FIG. 3. Given that the stress causing the deformation is applied by the bonding agent 130 on the first and/or second component 110, 120, the stress is a lower limit for the bond strength. If the bond is incomplete or insufficiently strong, there can be a different strain measured, indicating that the apparatus (i.e., the first and second component 110, 120 held together by the bonding agent 130) may not pass industry standards. In at least one implementation, the strain may be measured via displacement from a first point and a second point, and the changing/separation of the first and second points is measured as opposed to observing the entire bond area, as is done in conventional measuring techniques.

Figure 5:
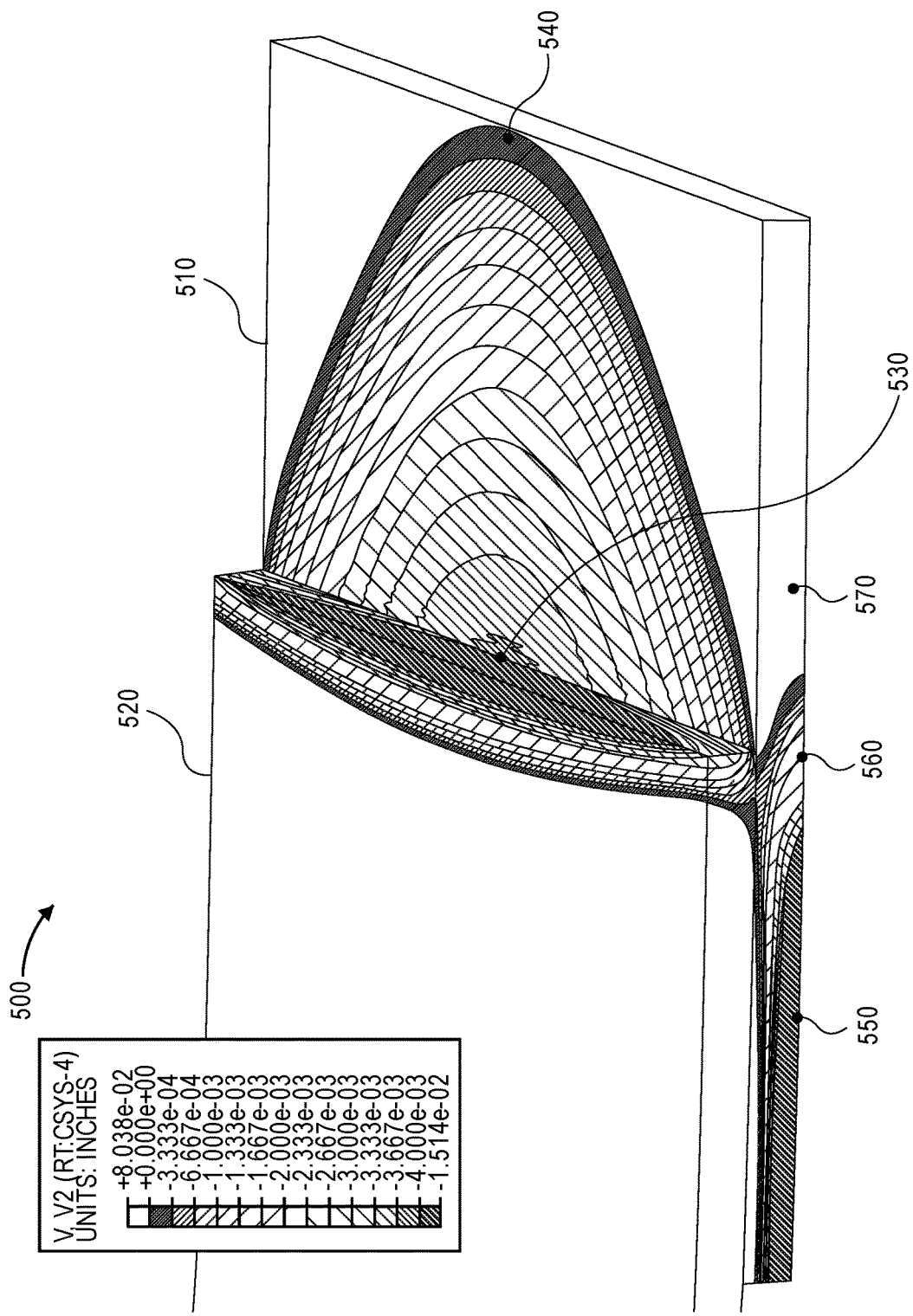
FIG. 5 depicts an image showing displacement in two components having planar surfaces that are overlapping and fully bonded together.
Figure 6:
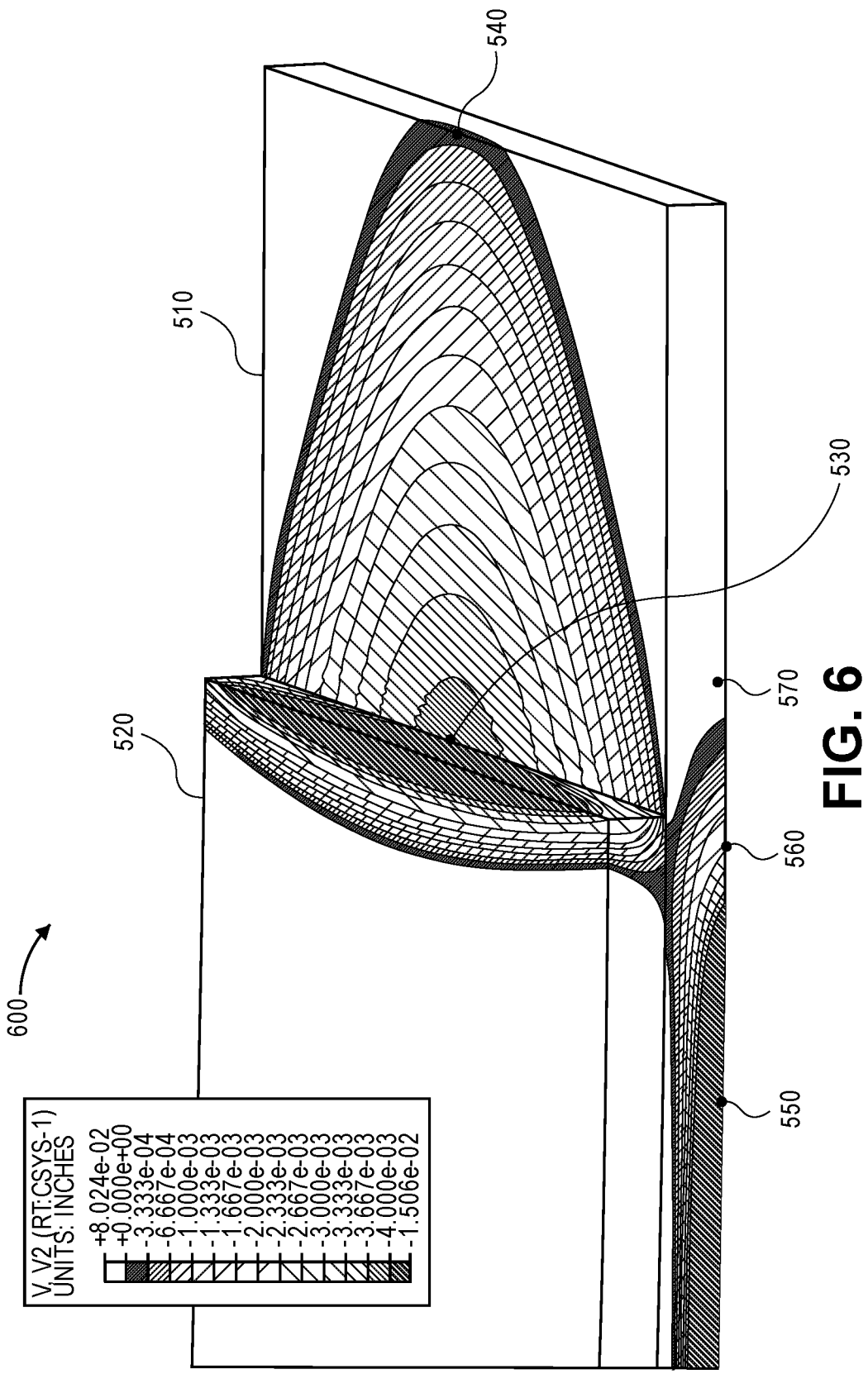
FIG. 6 depicts an image showing displacement in the two components of FIG. 5, where the planar surfaces are partially bonded together.

FIG. 5 depicts an image 500 showing displacement in two components 510, 520 having planar surfaces that are overlapping and fully bonded together, and FIG. 6 depicts an image 600 showing displacement in the two components 510, 520 of FIG. 5, where the planar surfaces are partially (not fully) bonded together. In FIGS. 5 and 6, the two components 510, 520 are made of similar materials (e.g., aerospace composite tape laminates) but with different layup angle sequences that result in different CTEs in the plane of the bond. When the bond is only partially formed, as in FIG. 6, the stresses and strains are lower. In FIG. 6, the bond formed over only about half of the area that was intended to be bonded. The displacement over the illustrated 1-inch width of the center of the unbonded area from point 530 to point 540 varies from $-3.899e-3$ to $-3.458e-3$ in; a displacement difference of $4.41e-4$ in. For the fully-formed bond shown in FIG. 5, the displacement difference is $6.79e-4$ in.

There is a measurable difference in the strain near the bond, between a fully-formed and a partially-formed bond. In some implementations, the difference in performance between a normal "everyday" bond and a failed application of adhesive can be detected without breaking the part or testing the bond to its limit. The method 200 disclosed herein provides the ability to prove that a bond is as strong as a baseline/calibration bond, non-destructively.

In at least one implementation, the method 200 can be used in yet another way for large area bonded surfaces with different CTEs. Two materials with different CTEs (in at least one direction) can cause bending when going through a temperature change (e.g., from the temperature at which the bond formed down to room temperature). This bending can be measured by the strain measurement tool 100. Since this is a macro-scale effect, the bending can be measured on the far side of the surface from the bond, such as by measuring displacement differences between points 550, 560, and 570.

Figure 7:
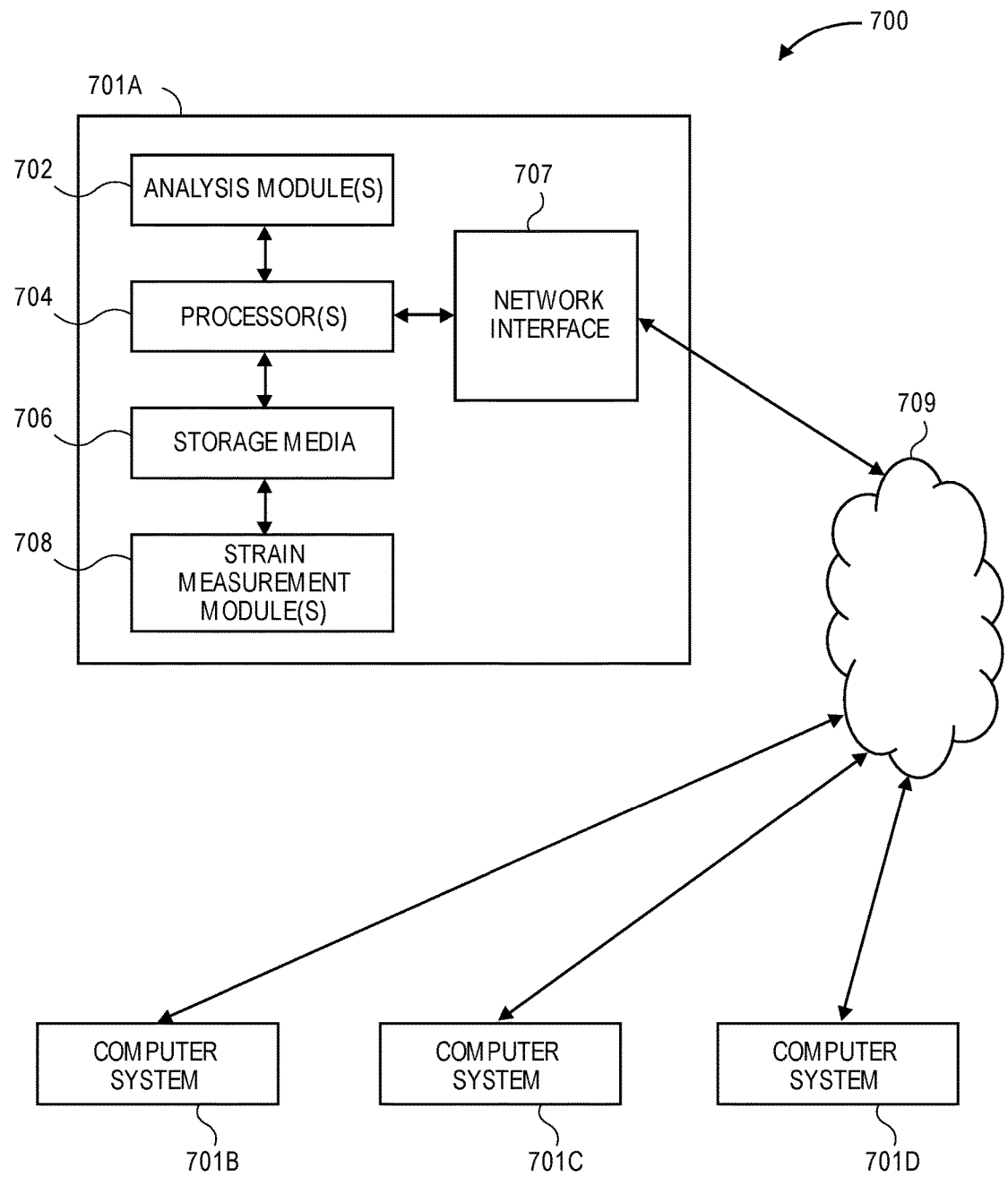
FIG. 7 depicts a schematic view of a computing system for performing one or more of the methods disclosed herein.

In some implementations, the methods of the present disclosure can be executed by a computing system. FIG. 7 illustrates an example of such a computing system 700, in accordance with some implementations. The computing system 700 can include a computer or computer system 701A, which can be an individual computer system 701A or an arrangement of distributed computer systems. In various implementations, the computer system 701A can implement a cloud computing environment. The computer system 701A includes one or more analysis modules 702 that are configured to perform various tasks according to some implementations, such as one or more methods disclosed herein. To perform these various tasks, the analysis module 702 executes independently, or in coordination with, one or more processors 704, which is (or are) connected to one or more storage media 706. The processor(s) 704 is (or are) also connected to a network interface 707 to allow the computer system 701A to communicate over a data network 709 with one or more additional computer systems and/or computing systems, such as 701B, 701C, and/or 701D (note that computer systems 701B, 701C and/or 701D may or may not share the same architecture as computer system 701A, and may be located in different physical locations, e.g., computer systems 701A and 701B may be located in a processing facility, while in communication with one or more computer systems such as 701C and/or 701D that are located in one or more data centers, and/or located in varying countries on different continents). In various implementations, computer systems 701B, 701C, and/or 701D can represent computing systems utilized by users of the cloud computing environment.

A processor can include a microprocessor, microcontroller, processor module or subsystem, programmable integrated circuit, programmable gate array, or another control or computing device.

The storage media 706 can be implemented as one or more computer-readable or machine-readable storage media. Note that while in the example implementation of FIG. 7 storage media 706 is depicted as within computer system 701A, in some implementations, storage media 706 can be distributed within and/or across multiple internal and/or external enclosures of computing system 701A and/or additional computing systems. Storage media 706 can include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that instructions can be provided on one computer-readable or machine-readable storage medium, or can be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components. The storage medium or media can be located either in the machine running the machine-readable instructions, or located at a remote site from which machine-readable instructions can be downloaded over a network for execution.

In some implementations, computing system 700 contains one or more strain measurement module(s) 708. It should be appreciated that computing system 700 is one example of a computing system, and that computing system 700 may have more or fewer components than shown, may combine additional components not depicted in the example implementation of FIG. 7, and/or computing system 700 may have a different configuration or arrangement of the components depicted in FIG. 7. The various components shown in FIG. 7 may be implemented in hardware, software, or a combination of both hardware and software, including one or more signal processing and/or application specific integrated circuits.

Further, the steps in the processing methods described herein can be implemented by running one or more functional modules in information processing apparatus such as general purpose processors or application specific chips, such as ASICs, FPGAs, PLDs, or other appropriate devices. These modules, combinations of these modules, and/or their combination with general hardware are included in various implementations.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. It will be appreciated that structural components and/or processing stages can be added or existing structural components and/or processing stages can be removed or modified. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "about" indicates that the value listed may be somewhat altered, as long as the alteration does not result in nonconformance of the process or structure to the present teachings. The present disclosure provides specific implementations without being exhaustive, and other implementations of the present teachings may be apparent to those skilled in the art from consideration of the specification and practice of the disclosure herein. It is intended that the specification and examples be considered as exemplary only, with a true scope and spirit of the present teachings being indicated by the following claims.

The invention claimed is:

1. A method for determining a strain, comprising:
   bonding first and second components together using a bonding agent;
   heating the first component and the bonding agent to a predetermined temperature from about 105° C. to about 125° C. for a predetermined duration from about 80 minutes to about 100 minutes; and
   measuring a strain in the first component using a strain measurement tool as the first component cools, wherein the strain measurement tool is configured to detect movement of the first component as the first component cools.

2. The method of claim 1, further comprising applying a visual indicator material to the first component, wherein the strain measurement tool detects movement of particles in the visual indicator material as the first component cools.

3. The method of claim 2, further comprising comparing the strain to a reference standard.

4. The method of claim 2, wherein the first component and the second component have different coefficients of thermal expansion.

5. The method of claim 4, wherein the first component and the second component have different strengths.

6. A method for determining a strain, comprising:
   applying a visual indicator material to a first component;
   applying a bonding agent to the first component;
   pressing the first component and a second component together with the bonding agent positioned at least partially therebetween;
   heating the first component and the bonding agent to a predetermined temperature from about 105° C. to about 125° C. for a predetermined duration from about 80 minutes to about 100 minutes;
   cooling the first component and the bonding agent; and
   measuring a strain in the first component using a strain measurement tool, wherein the strain measurement tool is configured to detect movement of the visual indicator material on the first component as the first component cools.

7. The method of claim 6, wherein the visual indicator material is applied to the first component outside a bond area of the first component.

8. The method of claim 6, wherein the visual indicator material comprises a liquid having a plurality of particles dispersed therein, wherein the particles are a different color than the liquid.

9. The method of claim 6, wherein the strain is measured without applying any external forces to the first component.

10. The method of claim 6, wherein the strain is a result only of deformation of the first component, the second component, or both due to a temperature change.

11. The method of claim 6, further comprising determining a stress in the first component based at least partially upon the strain and a modulus of a material of the first component.

12. The method of claim 11, further comprising comparing the stress to a reference standard.

13. A method for determining a strain, comprising:
applying a visual indicator material to a first component and a second component, wherein the first and second components have different coefficients of thermal expansion;
applying a bonding agent to the first component, the second component, or both;
pressing the first component and the second component together with the bonding agent positioned at least partially therebetween;
heating the first component, the second component, and the bonding agent to a predetermined temperature from about 30° C. to about 60° C. for a predetermined duration from about 125 minutes to about 150 minutes;
cooling the first component, the second component, and the bonding agent after heating the first component, the second component, and the bonding agent; and
measuring a strain in the first component, the second component, or both using a strain measurement tool without applying external forces to the first component and the second component, wherein the strain measurement tool detects movement of particles in the visual indicator material as the first component, the second component, or both deform in response to the cooling.

14. The method of claim 13, wherein the different coefficients of thermal expansion are in a direction parallel to a surface of the first component having the bonding agent applied thereto.

15. The method of claim 13, wherein the bonding agent at least partially overlaps the visual indicator material.

16. The method of claim 13, wherein the visual indicator material is applied to the first component and the second component outside a bond area.

17. The method of claim 16, further comprising comparing the strain at a first location proximate to the bond area to the strain at a second location distal to the bond area.

18. The method of claim 13, further comprising determining a stress in the first component, the second component, or both based at least partially upon the strain and a modulus of a material of the first component, the second component, or both.

19. The method of claim 18, further comprising comparing the strain, the stress, or both to a reference standard to determine whether a strength of a bond between the first and second components is greater than or equal to a predetermined standard.

20. The method of claim 1, wherein the second component is also heated to the predetermined temperature for the predetermined duration, and wherein, as the first and second components cool, the first component contracts more in its through-thickness direction than the second component contracts in its in-plane direction, resulting in tensile forces in the first component and compressive forces in the second component.

* * * * *